United States Patent
Vrane

(10) Patent No.: US 11,965,813 B2
(45) Date of Patent: Apr. 23, 2024

(54) METHODS AND APPARATUS FOR CENTRAL SOURCE PRESSURE-BASED CYTOMETER FLUIDICS SYSTEM

(71) Applicant: CYTEK BIOSCIENCES, INC., Fremont, CA (US)

(72) Inventor: David Vrane, Fremont, CA (US)

(73) Assignee: Cytek Biosciences, Inc., Fremont, CA (US)

( * ) Notice: Subject to any disclaimer, the term of this patent is extended or adjusted under 35 U.S.C. 154(b) by 138 days.

(21) Appl. No.: 17/390,984

(22) Filed: Aug. 1, 2021

(65) Prior Publication Data

US 2022/0034783 A1 Feb. 3, 2022

Related U.S. Application Data

(60) Provisional application No. 63/060,663, filed on Aug. 3, 2020.

(51) Int. Cl.
*G01N 15/14* (2006.01)
*G01N 15/1404* (2024.01)
*G01N 15/10* (2006.01)

(52) U.S. Cl.
CPC . *G01N 15/1404* (2013.01); *G01N 2015/1006* (2013.01); *G01N 2015/1409* (2013.01)

(58) Field of Classification Search
CPC ....... G01N 15/1404; G01N 2015/1006; G01N 2015/1409
See application file for complete search history.

(56) References Cited

U.S. PATENT DOCUMENTS

| | | | |
|---|---|---|---|
| 4,844,610 A * | 7/1989 | North, Jr. ........... | G01N 15/1404 356/73 |
| 5,040,890 A * | 8/1991 | North, Jr. ............ | G05D 16/028 356/73 |
| 6,767,188 B2 | 7/2004 | Vrane | |
| 2004/0062685 A1 | 4/2004 | Norton | |
| 2009/0107893 A1 | 4/2009 | Schembri | |
| 2012/0103112 A1 | 5/2012 | Vrane | |
| 2013/0333765 A1* | 12/2013 | Fox .................... | G01N 15/1404 137/2 |
| 2018/0156710 A1 | 6/2018 | Vrane | |
| 2018/0156711 A1 | 6/2018 | Vrane | |

\* cited by examiner

*Primary Examiner* — Nathaniel J Kolb
(74) *Attorney, Agent, or Firm* — Alford Law Group, Inc.

(57) ABSTRACT

A system, method, and apparatus are provided for cytometer fluidics. In one example, a pressure regulation system is provided for a cytometer fluidics system. The pressure regulation system includes a pressure regulator and a transducer. The pressure regulator pressurizes sheath fluid in a fluid path. The transducer senses a measured pressure in the fluid path independently of the sheath tank. The transducer converts the measured pressure into a voltage. The transducer communicates the voltage to the pressure regulator. The pressure regulator translates the voltage to a regulated pressure that substantially matches the measured pressure. The pressure regulator is the only pressure regulation source in the cytometry fluidics system.

15 Claims, 15 Drawing Sheets

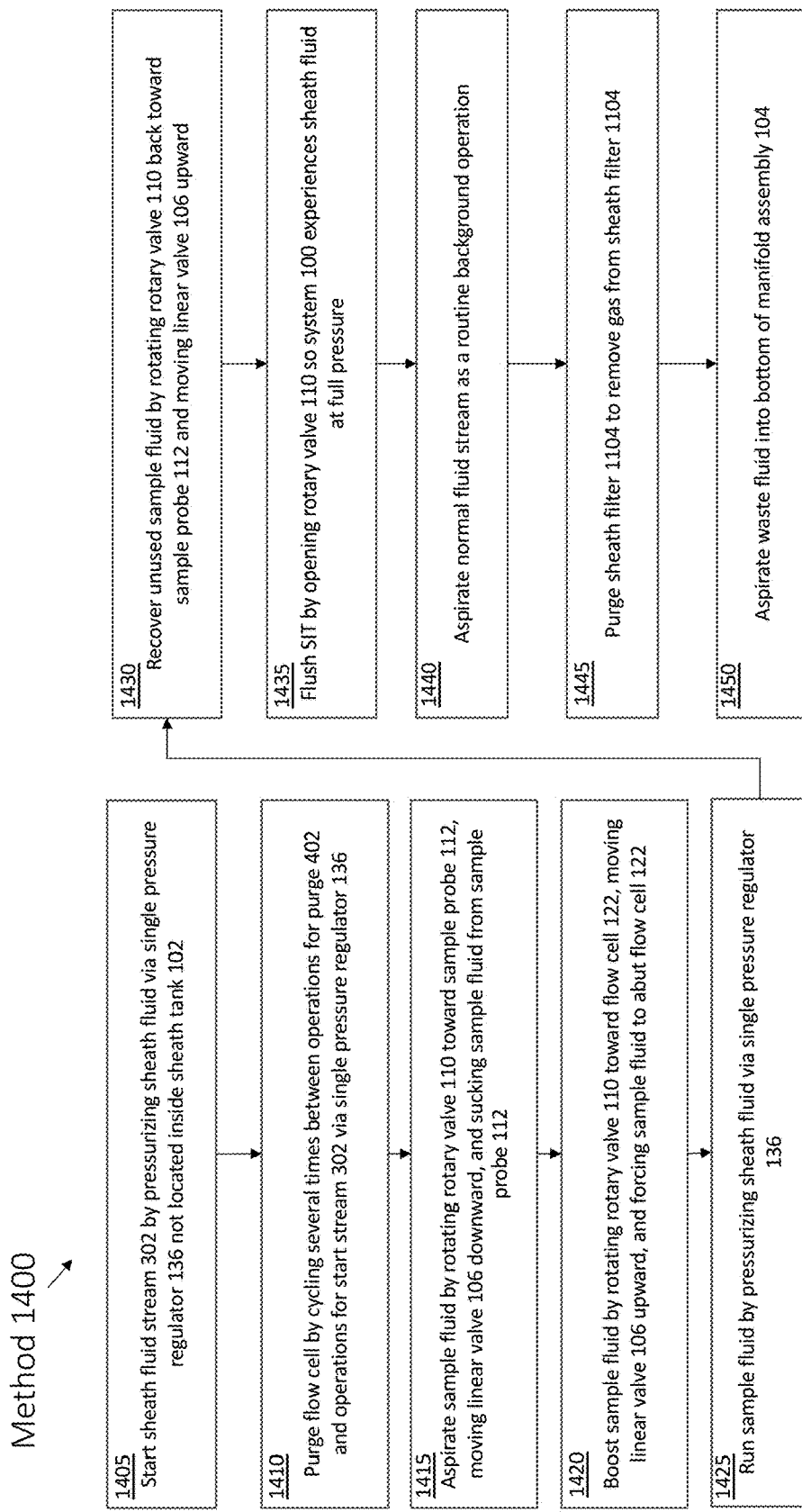

METHODS AND APPARATUS FOR CENTRAL SOURCE PRESSURE-BASED CYTOMETER FLUIDICS SYSTEM

RELATED APPLICATIONS

This United States (U.S.) patent application is non-provisional patent application claiming priority to U.S. provisional patent application No. 63/060,663 filed on Aug. 3, 2020 by David Vrane titled CENTRAL SOURCE PRESSURE-BASED CYTOMETER FLUIDICS SYSTEM, incorporated by reference for all intents and purposes.

This U.S. patent application is related to U.S. patent application Ser. No. 15/817,277 filed on Nov. 19, 2017 by David Vrane titled FLOW CYTOMETRY SYSTEM WITH STEPPER FLOW CONTROL VALVE, incorporated by reference for all intents and purposes. This U.S. patent application is also related to U.S. patent application Ser. No. 15/942,430 filed on Mar. 30, 2018 by Ming Yan et al. titled COMPACT MULTI-COLOR FLOW CYTOMETER HAVING COMPACT DETECTION MODULE, incorporated by reference for all intents and purposes. This U.S. patent application is also related to U.S. Pat. No. 9,934,511 filed on Dec. 1, 2011 by Wenbin Jiang titled RAPID SINGLE CELL BASED PARALLEL BIOLOGICAL CELL SORTER, incorporated by reference for all intents and purposes.

FIELD

The embodiments of the invention relate generally to fluid flow control in flow cytometer systems and cell sorter systems.

BACKGROUND

Flow cytometry involves the optical measurement of cells or particles of a test sample carried in a fluid flow. The collective instrumentation that achieves this task is known as a flow cytometer. Similar to a flow cytometer is a cell sorter (sorting flow cytometer) that further sorts cells in a sample into different output storage devices (e.g., test tubes) for further analysis.

The control of the flow of fluid with the test sample in a flow cytometer and a cell sorter is important to accurately analyze the type and quantity of cells or particles in the test sample. If the velocity of the fluid flow is a variable (e.g., too low or high around a typical), the identity of cells or particles in the test sample can be misrepresented. Moreover, an overcomplicated fluid control system may be unreliable with extra control devices.

BRIEF SUMMARY

The embodiments are summarized by the claims. However, briefly, a system, method, and apparatus for a central source pressure-based cytometer fluidics system are described.

A sorting flow cytometer is provided. The sheath and sample streams are driven by a pressure regulation system that includes a single feedback-controlled pressure source. The feedback component is a transducer that is in the common fluid path. The sample flow rate is modulated by relative resistance balance between the sheath and sample paths. Advantageously, the single pressure source eliminates head effects associated with liquid level inside the pressurized sheath tank.

BRIEF DESCRIPTIONS OF THE DRAWINGS

Various embodiments are illustrated by way of example, and not by way of limitation, in the figures of the accompanying drawings.

FIG. 14 is a flowchart of a method for operating the central source pressure-based cytometer fluidics system.

It will be recognized that some, or all, of the Figures are for purposes of illustration and do not necessarily depict the actual relative sizes or locations of the elements shown. The Figures are provided for the purpose of illustrating one or more embodiments with the explicit understanding that they will not be used to limit the scope or the meaning of the claims.

DETAILED DESCRIPTION

In the following detailed description of the embodiments, numerous specific details are set forth. However, it will be obvious to one skilled in the art that the embodiments may be practiced without these specific details. In other instances, well known methods, procedures, components, and circuits have not been described in detail so as not to unnecessarily obscure aspects of the embodiments. The various sections of this description are provided for organizational purposes. However, many details and advantages apply across multiple sections.

Figure 1A:
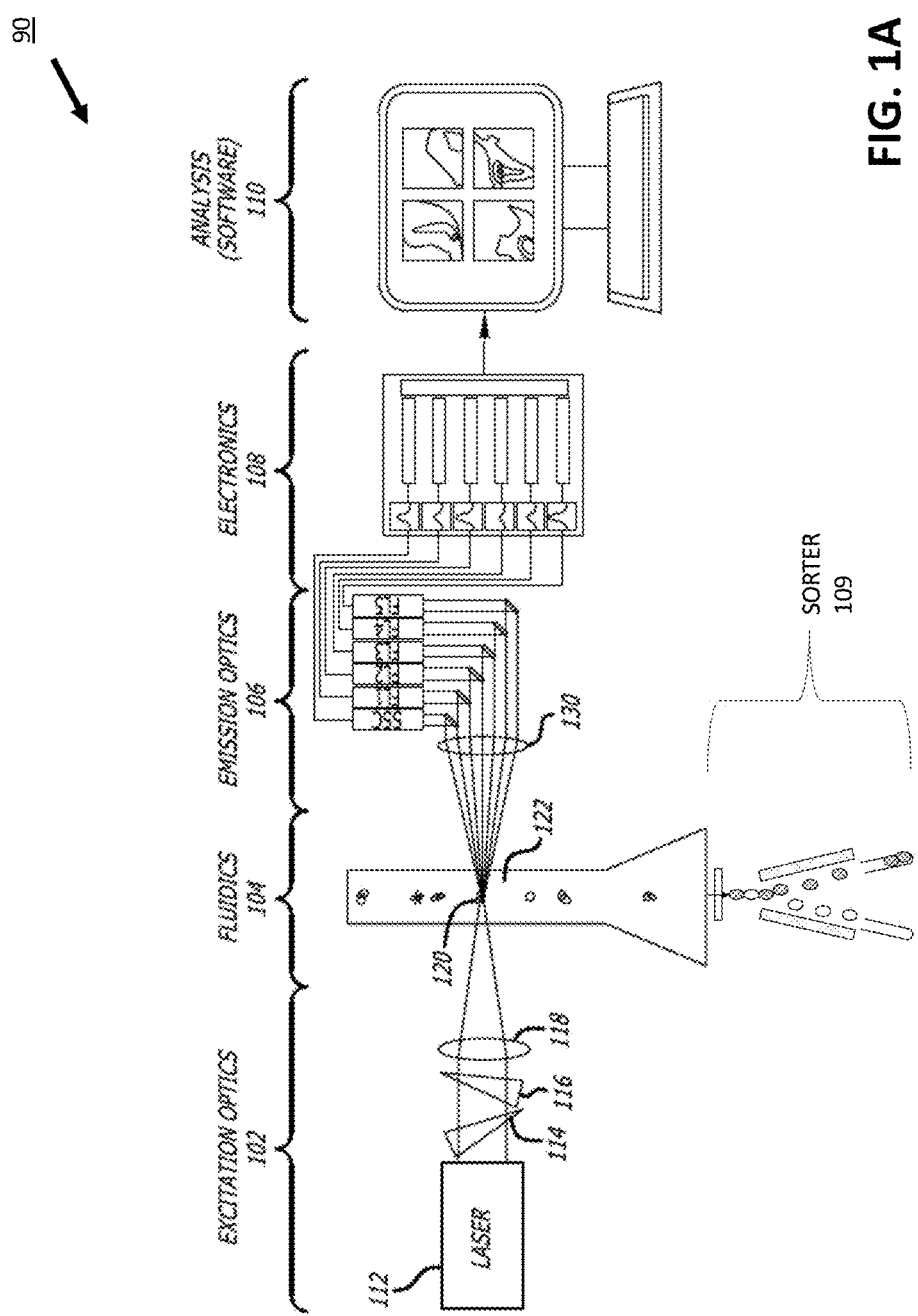
FIG. 1A is a basic conceptual diagram of a flow cytometer system and a cell sorter system.

Referring now to FIG. 1A, to put the disclosed embodiments in context, a basic conceptual diagram of a cell sorter system 90 and a flow cytometer system 90 is shown. Five major subsystems of the system 90 include an excitation optics system 102, a fluidics system 104, an emission optics system 106, an acquisition system 108, and an analysis system 110. In the case of a cell sorter system, the system further includes a cell sorting system 109. Generally, a "system" includes (electrical, mechanical, and electro-mechanical) hardware devices, software devices, or a combination thereof.

The excitation optics system 102 includes, for example, a laser device 112, an optical element 114, an optical element 116, and an optical element, 118. Example optical elements include an optical prism and an optical lens. The excitation optics system 102 illuminates an optical interrogation region 120. The fluidics system 104 carries fluid samples 122 through the optical interrogation region 120. The emission optics system 106 includes, for example, an optical element 130 and various optical detectors including a side scatter (SSC) channel detector, fluorescent wavelength range one (FL1) detector, fluorescent wavelength range two (FL2) detector, fluorescent wavelength range three (FL3) detector, fluorescent wavelength range four (FL4) detector, and fluorescent wavelength range five (FL5) detector. The emission optics system 106 gathers photons emitted or scattered from passing particles. The emission optics system 106 focuses these photons onto the optical detectors SSC, FL1, FL2, FL3, FL4, and FL5. Optical detector SSC is a side scatter channel. Optical detectors FL1, FL2, FL3, FL4, and FL5 are fluorescent detectors may include band-pass, or long-pass, filters to detect a particular and differing fluorescence wavelength ranges. Each optical detector converts photons into electrical pulses and sends the electrical pulses to the acquisition (electronics) system 108. The acquisition system 108, including one or more analog to digital converters and digital storage devices, processes and prepares these signals for analysis in the analysis system 110.

The disclosed embodiments are employed for the most part in the fluidics system 104 of a cell sorter system and a flow cytometer system. U.S. patent application Ser. No. 15/817,277 and U.S. patent application Ser. No. 15/942,430 disclose exemplary flow cytometer systems that are incorporated by reference. U.S. Pat. No. 9,934,511 discloses a cell sorter system that is incorporated herein by reference.

Fluidics System Overview

Figure 1B:
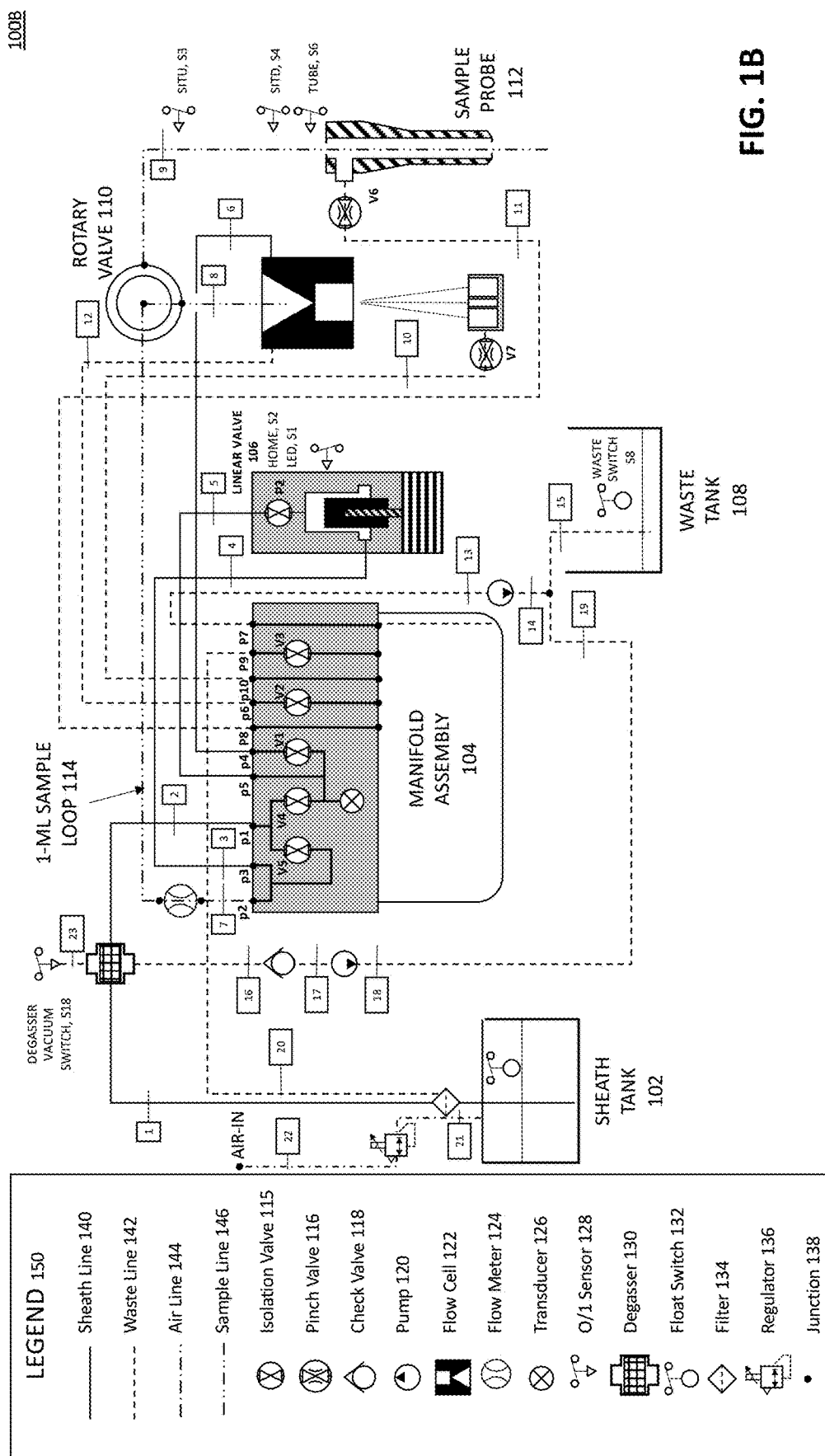
FIG. 1B is a schematic diagram of a central source pressure-based cytometer fluidics system.

Referring now to FIG. 1B, a schematic diagram of a central source pressure-based cytometer fluidics system 100. A legend 150 is provided to help identify some components of the system 100 and to help keep the figures uncluttered. The system 100 may include, without limitation, one or more of each of the following components: a sheath tank 102, a manifold assembly 104, one or more isolation valves 115 (e.g., valves V1-V5, and valve P2), one or more ports (e.g., ports p1-p1), a linear valve 106, a waste tank 108, a rotary valve 110, a sample probe 112, a sample loop 114 (e.g., 1-ml sample loop), one or more pinch valves 116 (e.g., valves V6 and V7), a check valve 118, a pump 120, and a flow cell 122, a flow meter 124, a transducer 126, an 0/1 sensor 128 (e.g., sensors S1-S8), a degasser 130 (e.g., degasser vacuum switch S18), a flow switch 132 (e.g., waste switch S8), a filter 134, a pressure regulator 136, a junction 138, a sheath line 140, a waste line 142, an air/gas line 144, and a sample line 146. Lines are identified as lines 1-23. A line is a conduit or tube through which fluid (e.g., gas or liquid) flows. The components may be coupled as shown to form the system 100.

A goal of the system 100 is to push sheath fluid and sample fluid to the flow cell 122 in the most stable means possible. The pressure regulator 136 applies pressure to the sheath tank 102. That pressure pushes sheath fluid and sample fluid throughout the system 100. Pressurized sheath fluid and sample fluid can flow to the flow cell 122 and through the flow cell 122. The flow cell 122 counts events, for example, counts sample particles of interest passing through the flow cell 122. The pressurized fluid (e.g., sample and sheath) streams out of a nozzle at the bottom of the flow cell 122. The system 100 breaks up the pressurized fluid that streams out of the nozzle into droplets. The system 100 can then selectively impart an electric charge on particularly identified droplets emanating from the nozzle. The electric charge on the droplets enables the system 100 to deflect each charged droplet off center, away from a normal center stream. The deflection enables the system 100 to sort the fluid (droplets) emanating from the nozzle. The system 100 can thereby collect charged droplets (sorted fluid) in one or more separate vessels from those that were uncharged (unsorted fluid). Unsorted fluid, usually in a center stream, is typically waste. Side streams are typically the charged droplets (sorted fluid) of interest. The system 100 sorts the fluids and sends unsorted fluids to waste via an aspirator (not shown) through valve V7. Accordingly, the aspirator aspirates air/gas, the waste fluid, and sheath fluid into the manifold assembly 104. The manifold assembly 104 has a pump that pumps the waste fluids into the waste tank 108.

In more detail, sheath fluid enters the system 100 via line 1 and flows through a valving network. The sheath line from the sheath tank splits into two branches. In a first branch, sheath fluid (100% pure sheath) flows to the flow cell 122 via line 6. In a co-flowing second branch (e.g., parallel second branch), sample fluid (e.g., blood sample) flows through the sample loop 114, which runs through the rotary valve 110 and into the flow cell 122. A rotary valve 110 determines the components to which the sample loop 114 is coupled. For example, when the system 100 is aspirating sample fluid, the rotary valve 110 couples the sample loop 114 to the sample probe 112. When the system 100 is running the rotary valve 110 couples the sample loop 114 to the flow cell 122. The system 100 opens valve V5. Sample fluid and sheath fluid flow into the flow cell 122. Both the sample fluid and sheath fluid are driven by the same pressure but are flowing through paths of different resistances (e.g., different restrictions).

The restriction of the sample loop 114 is substantially higher than the restriction of the sheath line 140. The restrictions ratio (sample restriction/fluid restriction) governs the ratio of sample fluid to sheath fluid. The linear valve 106 modulates the restriction in the sheath line 140 to obtain different sample fluid flow rates through the sample loop 114. The linear valve 106 can modulate the restriction by varying the length of the sheath line 140. Differences in path lengths and diameters also contribute to differences in restrictions.

In a traditional system (not shown), a first pressure regulator pressurizes a sheath tank, while a second pressure regulator pressurizes a sample tube. A pressure difference between the sheath fluid pressure and the sample fluid pressure governs a flow rate of the sample fluid that is pushed into a flow cell. So, there is a separate sample tank (like the sheath tank) that has a second pressure regulator that is different than the first pressure regulator for the sheath tank. Unfortunately, such a traditional system is problematic. The multiple pressure regulators might not be perfectly in sync, but the multiple pressure regulators must be perfectly in sync. Destructive back filling might occur on the sample fluid, thereby destroying the sample fluid and introducing undesirable bubbles into the traditional system. Also, having multiple pressure regulators is pricey.

Advantageously, the present system 100 solves the problems that are present in the traditional system by using one pressure regulation system for both the sheath fluid (e.g., sheath line 140) and the sample fluid (e.g., sample loop 114). The pressure regulation system includes the single pressure regulator 136 and the transducer 126. The system 100 has no other regulated pressure source than the pressure regulator 136. Accordingly, the system 100 does not experience sync issues with pressurization. Also, a system 100 with a single pressure regulator 136 is less expensive, simpler, easier to manufacture, and has lower maintenance costs than a traditional system that has multiple pressure regulators.

For the system 100 to analyze a sample fluid, there needs to be a mechanism for getting the sample fluid into the sample 114. In this case, the linear valve 106 (e.g., piston pump, syringe drive) splits duties. Most of the time, the linear valve 106 is governing restriction. When it is time to pull sample fluid into the sample loop 114, the linear valve 106 switches duties and acts like a syringe drive. The rotary valve 110 then switches position, while the linear valve 106 draws sample into the sample loop 114. The rotary valve 110 then switches to a normal rotary valve position, while the linear valve 106 returns to the restrictive position. A valve is opened to allow both sheath fluid and sample fluid to enter the flow cell 122 at substantially the same time.

Electrical Analog

Figure 2:
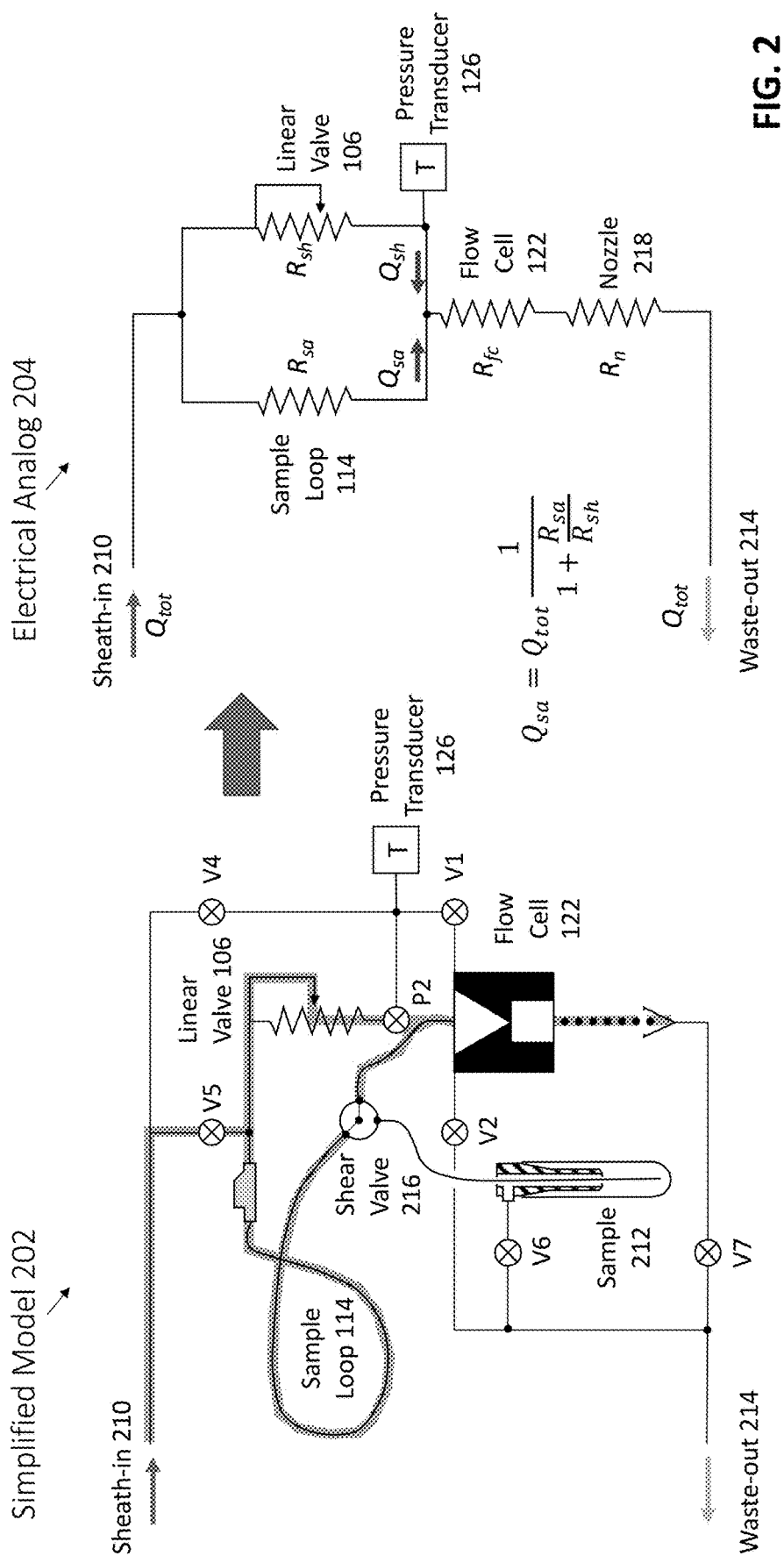
FIG. 2 is a schematic diagram showing an electrical analog to a simplified model of the system.

FIG. 2 is a schematic diagram showing an electrical analog 204 to a simplified model 202 of the system 100. The simplified model 202 includes, without limitation, sheath fluid 210 (e.g., sheath-in), sample fluid 212, waste fluid 214 (e.g., waste-out), a shear valve 216, the linear valve 106, the sample loop 114, the pressure transducer 126, the flow cell 122, and the valves V1, V2, V4-V7, and P2.

The electrical analog 204 is a circuit that includes, without limitation, a sample resistor $R_{sa}$, a sheath resistor $R_{sh}$, a flow cell resistor $R_{fc}$, and a nozzle resistor $R_n$. The electrical analogy 164 also shows the context of the sheath fluid 210, the waste fluid 214, the linear valve 106, the sample loop 114, the pressure transducer 126, the flow cell 122, and a nozzle 218 of the flow cell 122.

The sample resistor $R_{sa}$ is analogous to the resistance (e.g., restriction) in the sample fluid path at the sample loop 114. The variable sheath resistor $R_{sh}$ is analogous to the resistance (e.g., restriction) in the sheath fluid path at the linear valve linear valve 106. The flow cell resistor $R_{fc}$ is analogous to the resistance (e.g., restriction) at the flow cell 122. The nozzle resistor $R_n$ is analogous to the resistance (e.g., restriction) at the nozzle 218 of the flow cell 122.

A total current $Q_{tot}$ is analogous to the flow rate of the total fluid or sheath fluid 210. A sample current $Q_{sa}$ is analogous to the flow rate of the sample fluid 212 at the sample loop 114. A sheath current $Q_{sh}$ is analogous to the flow rate of the sheath fluid 210 at the linear valve 106.

The sample resistor $R_{sa}$ and the variable sheath resistor $R_{sh}$ are coupled in parallel and share a first node and a second node. The flow cell resistor $R_{fc}$ is coupled to the second node. The flow cell resistor $R_{fc}$ is coupled to the nozzle resistor $R_n$ at a third node. The total current $Q_{tot}$ enters the electrical analog 204 at the first node and is split between the sample current $Q_{sa}$ and the sheath current $Q_{sh}$. The sample current $Q_{sa}$ passes through the sample resistor $R_{sa}$. The sheath current $Q_{sh}$ passes through the variable sheath resistor $R_{sh}$. The sample current $Q_{sa}$ and the sheath current $Q_{sh}$ combine to form the total current $Q_{tot}$. So, the sample current $Q_{sa}$ plus the sheath current $Q_{sh}$ equals the total current $Q_{tot}$. The total current $Q_{tot}$ passes through the flow cell resistor $R_{fc}$ and the nozzle resistor $R_n$. The sample current $Q_{sa}$ can be described by using the following equation:

$$Q_{sa} = Q_{tot} \frac{1}{1 + \frac{R_{sa}}{R_{sh}}} \quad \text{Eq. 1}$$

Accordingly, the flow rate of the sample fluid 212 can be described by using the following equation:

$$\text{Flow Rate}_{sa} = \text{Flow Rate}_{tot} \frac{1}{1 + \frac{\text{Restriction}_{sa}}{\text{Restriction}_{sh}}} \quad \text{Eq. 2}$$

Restriction$_{sa}$ is the resistance (e.g., restriction) in the sample fluid path at the sample loop 114. Restriction$_{sh}$ is the restriction (e.g., restriction) in the sheath fluid path at the linear valve linear valve 106. Flow Rate$_{tot}$ is the flow rate of the total fluid or sheath fluid 210. Flow Rate$_{sa}$ is the flow rate of the sample fluid 212 at the sample loop 114.

Fluidics Bucket

Figure 13:
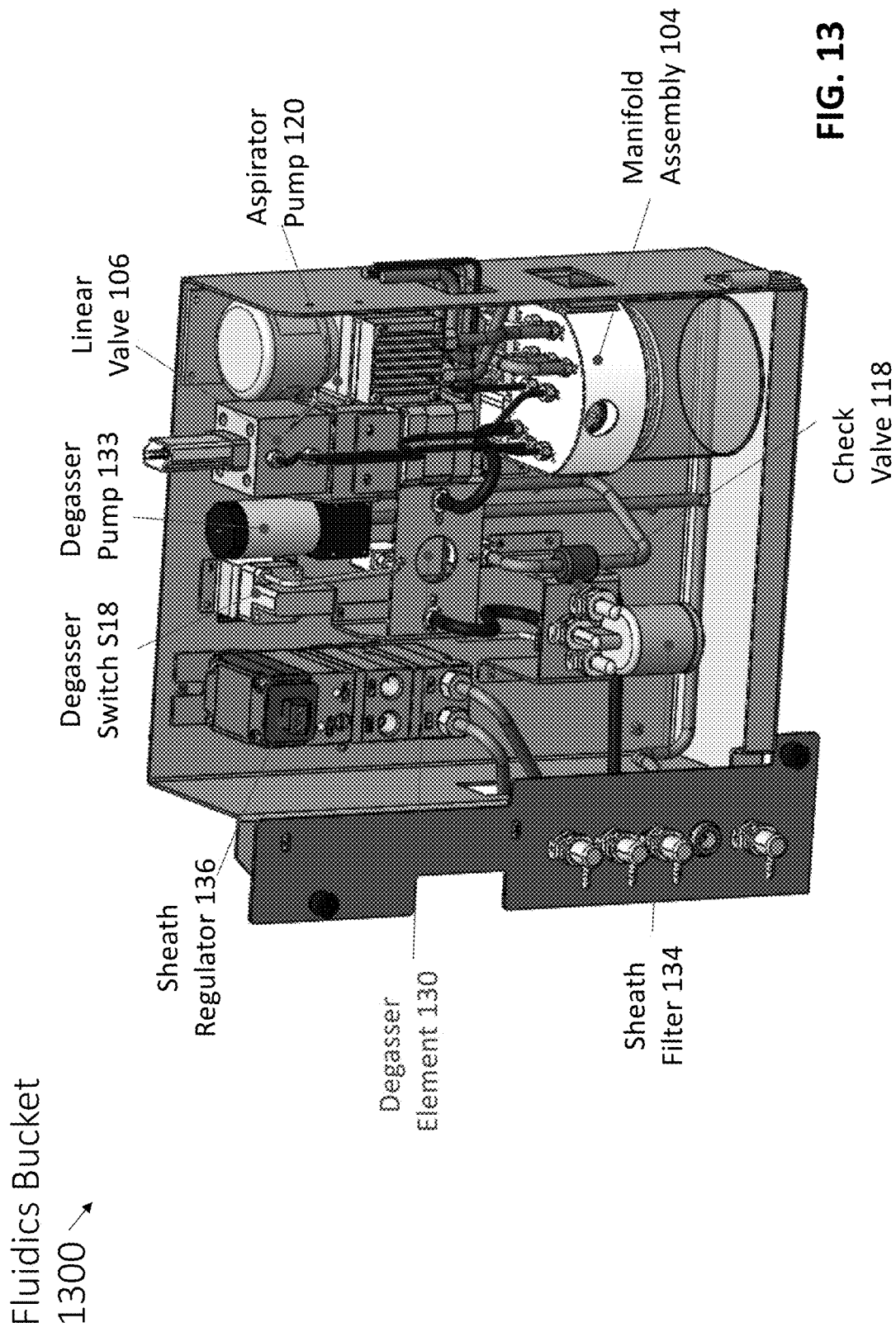
FIG. 13 is a conceptual drawing of a fluidics bucket for the central source pressure-based cytometer fluidics system.

FIG. 13 is a conceptual drawing of a fluidics bucket 1300 for the central source pressure-based cytometer fluidics system 100. FIG. 13 provides a more realistic depiction of some components of the fluidics system 100. The fluidics bucket 1300 includes, without limitation, the manifold assembly 104, the linear valve 106, the check valve 118, the aspirator pump 120, the degasser element 130, the degasser pump 133, the degasser switch S18, the sheath filter 134, and the sheath regulator 136.

Start Stream

Figure 3:
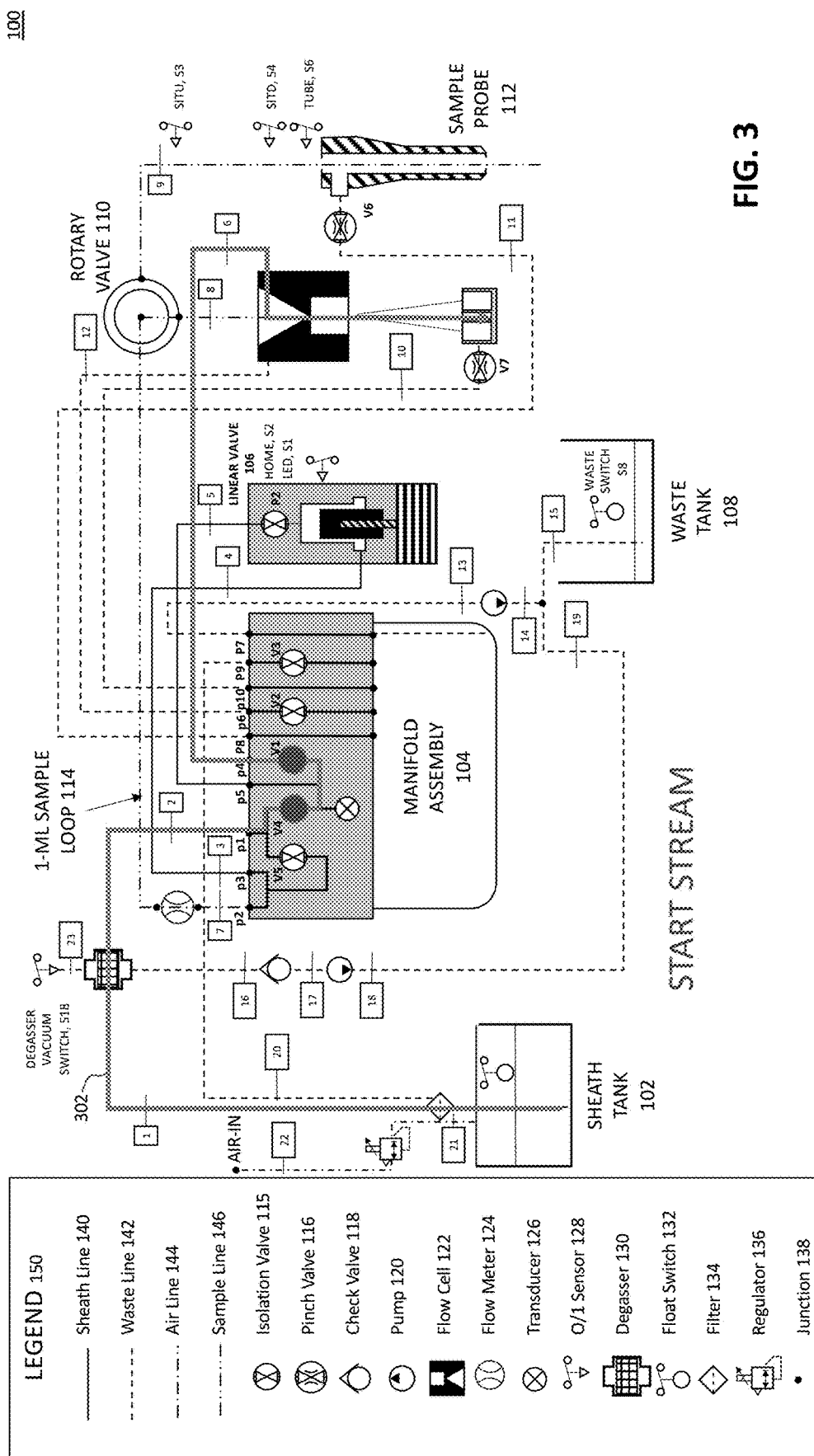
FIG. 3 is a schematic diagram of the central source pressure-based cytometer fluidics system during an operation for a start stream of sheath fluid.

FIG. 3 is a schematic diagram of the central source pressure-based cytometer fluidics system 100 during an operation for a start stream path 302 of sheath fluid. In one embodiment, the start stream path 302 includes a simple path (or simplest path), and a low restriction path (or lowest restriction path), for sheath fluid to flow to the flow sell 122. The sheath fluid flows from the sheath tank to 102 through line 1, line 2, degasser 130, valve V4, valve V1, line 6, and the flow cell 122. An example total flow rate of fluids in the start stream path 302 is about 6 milliliters per minute (ml/min). Because sample fluid is not running in this startup operation, the flow rate of the sheath fluid in the start stream path 302 is equal to the total flow rate (e.g., 6 ml/min). The pressure regulator 136 maintains the total flow rate in the system 100.

The pressure regulator 136 and the transducer 126 are coupled via a feedback loop (e.g., electronics feedback circuit). The transducer 126 is in line with the fluid that is at, under, or after valve V4. The transducer 126 may include, for example, a piezoelectric transducer that measures pressure at valve V4. The transducer 126 converts pressure-to-voltage or pressure-to-current (e.g., the opposite of what the pressure regulator 136 does).

The pressure regulator 136 maintains pressure at a substantially fixed level and regulates the total flow rate in the liquid path 302 by regulating air. The pressure regulator 136 may include, for example, a piezoelectric transducer that converts voltage-to-pressure or current-to-pressure (e.g., the opposite of what the transducer 126 does). The pressure regulator 136 attempts to maintain the liquid pressure that the transducer 126 senses at valve V4 regardless of what is running through the start stream path 302. Accordingly, the behavior of the pressure regulator 136 does not depend on whether sheath fluid or sample fluid is running through lines.

In contrast, a traditional system (not shown) typically includes a transducer in the sheath tank to measure the pressure of the air/gas above the fluid in the sheath tank. The traditional system attempts to regulate sheath fluid pressure via the air/gas in the sheath tank. Such a setup can be problematic because whenever the fluid level in the sheath tank changes, the air/gas gap above the fluid changes, and the effective pressure of the sheath fluid changes. The traditional system must compensate for such changes. Pressure instabilities often occur.

Advantageously, the present system 100 eliminates such problems. For example, the transducer 126 senses a measured pressure in the start stream path 302 passing through valve V4, as opposed to a pressure regulator trying to regulate the air pressure within the sheath tank 102. The transducer 126 converts and/or translates that liquid pressure into a voltage and/or current. The transducer 126 communicates that voltage and/or current to the pressure regulator 136 via the electrical feedback loop. The transducer 126 measures pressure independently of the sheath tank 102. By regulating pressure via the single pressure regulator 136, the system can substantially eliminate undesirable head effects (e.g., frothy foam) in the sheath tank 102.

The transducer 126 changes the level of an electrical signal (e.g., voltage and/or current) applied to the pressure regulator 136 via the feedback loop. For example, the transducer 126 sends, and the pressure regulator 136 receives, an electrical signal between a lower voltage (e.g., 0 Volts) and an upper voltage (e.g., 10 Volts). The pressure regulator 136 translates that electrical signal into a regulated pressure. Accordingly, the transducer 126 modulates the pressure regulator 136. The pressure regulator 136, in turn, regulates air pressure such that the liquid pressure, and liquid flow velocity, downstream from valve V4 remains substantially constant.

The degasser 130 helps minimize the amount of air/gas bubbles in the system 100. The degasser 130 is situated in line between line 1 and line 2 and actively pulls air/gas molecules (e.g., nitrogen and oxygen) out of the sheath fluid path. Consider, for example, a nozzle on the flow cell 122 having a diameter of 70 micrometers running at 70 psi, taken to a nozzle having a diameter of 100-micrometer nozzle running at 18 psi. When the pressure is dropped in such a manner, air/gas can come out of out of solution in the sheath tank, which leads to air/gas bubbles at the flow cell. The bubbles are typically microscopic and may not cause problems at the transducer 126. However, the microscopic bubbles tend to show up at the flow cell as an unacceptable amount of background noise. The degasser 130 helps minimize such microscopic bubbles and background noise.

Purge Flow Cell

Figure 4:
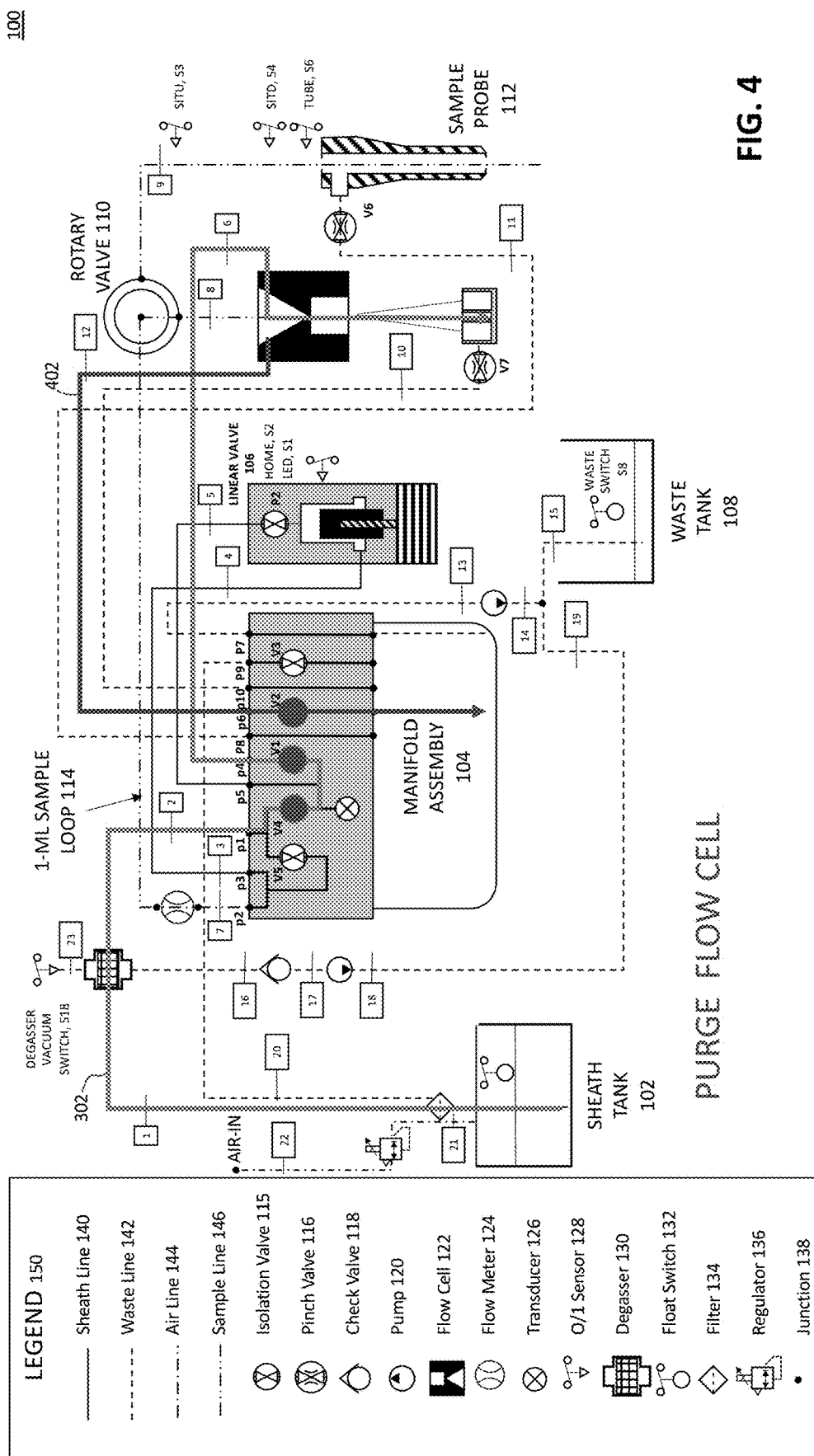
FIG. 4 is a schematic diagram of the central source pressure-based cytometer fluidics system during an operation for a flow cell purge.

FIG. 4 is a schematic diagram of the central source pressure-based cytometer fluidics system 100 during an operation for a flow cell purge path 302. A purpose of the flow cell purge path 302 is to purge air/gas from the start stream. In one embodiment, the flow cell purge path 402 includes, without limitation, line 12, port p6, and valve V2 of the manifold assembly 104.

On a first path, the sheath essentially flows like fluid in the start stream path 302 that is discussed with reference to FIG. 3. For example, the sheath fluid flows into the manifold assembly 104 via port p1, flows through valve V4, flows through valve V1, flows through line 6, and enters the flow cell 122. Ideally, the system 100 ejects a continuous liquid jet through a nozzle at the terminus of the flow cell 122 and into an aspirator.

However, at system start up, there may be air/gas in the lines and components that causes the sheath stream not to form a straight and stable liquid jet. For example, the sheath fluid that is flowing out of the nozzle of the flow cell 122 into an aspirator initially may not be flowing out of the nozzle straight and predictably, due to air/gas in the system 100. The diameter of the opening of the nozzle of the flow cell 122 may be, for example, 70 micrometers. Unfortunately, unwanted air/gas in the flow cell 122 causes energy to be wasted on compressing the unwanted air/gas, as opposed to producing accurately sample droplets from the nozzle of the flow cell 122. Unwanted air/gas bubbles in the system 100 act like shock absorbers, which is undesirable.

A co-flowing second path (e.g., parallel flow cell purge path 402) couples the flow cell to the manifold assembly 104. To purge air/gas bubbles, the system 100 cycles several times between the operations of the flow cell purge path 402 and the start stream path 302. Operations of the flow cell purge path 302 include forcing air/gas bubbles in the flow cell 122 to get swept out through line 12 and purged into the bottom of the manifold assembly 104. The system then cycles to operations of the start stream path 302, as discussed with reference to FIG. 3. The cycling can occur, for example, about 3-5 times in rapid succession. The cycling breaks up air/gas in the flow cell 122 into many smaller bubbles and purges that air into the bottom of the manifold assembly 104.

Advantageously, the flow cell purge path 302 improves the effectiveness of a drop drive, which is the ability of the flow cell 122 to produce consistent and predictable droplets from the nozzle. The flow cell purge path 302 includes a droplet driving transducer in the flow cell assembly to work more accurately and efficiently. The drop drive transducer is a vibrating piezo element. For example, the transducer may be vibrating at a frequency of between 20,000 Hz and 80,000 Hz. When the stream exits the nozzle of the flow cell 122, the transducer vibration frequency (e.g., 20,000 Hz-80,000 Hz) should produce droplets at the same rate (e.g., 20,000-80,000 droplets per second). Without unwanted air/gas in the flow cell 122, energy is not wasted on compressing the unwanted air/gas. Instead, the system 100 can focus energy from the transducer on producing droplets accurately and effectively.

The nozzle at the end of the flow cell 122 is a convectively dominated component. A pressure drop at the nozzle of the flow cell 122 is primarily due to Bernoulli's principle, which states that the speed of a fluid increases linearly as the decrease of the square root of the static pressure. The nozzle of the flow cell 122 is accelerating the flow of fluid from one diameter to another. That acceleration is substantially independent of viscosity. If the pressure drop can be held constant across the nozzle, then the flow cell 122 is effectively a constant volume device. Importantly, a constant volume device that performs convective flow across the nozzle is substantially independent of temperature. So, if the system 100 can regulate the line pressure in the system, then the flow cell 122 can have a volumetric flow rate that is, in some embodiments, accurate to within +/−2% across a broad operating temperature range.

Stability is enhanced by regulating on feedback from the liquid line pressure provided by the Pressure Transducer 126 instead of air pressure over the sheath tank. Doing so eliminates the sheath tank's gravity head from the regulation process and helps maintain a constant pressure drop across the nozzle. This, ensures that droplets produced by the jet emanating from the nozzle at the end of the flow cell 122 can be formed in a substantially identical manner.

Aspirate Sample Fluid

Figure 5:
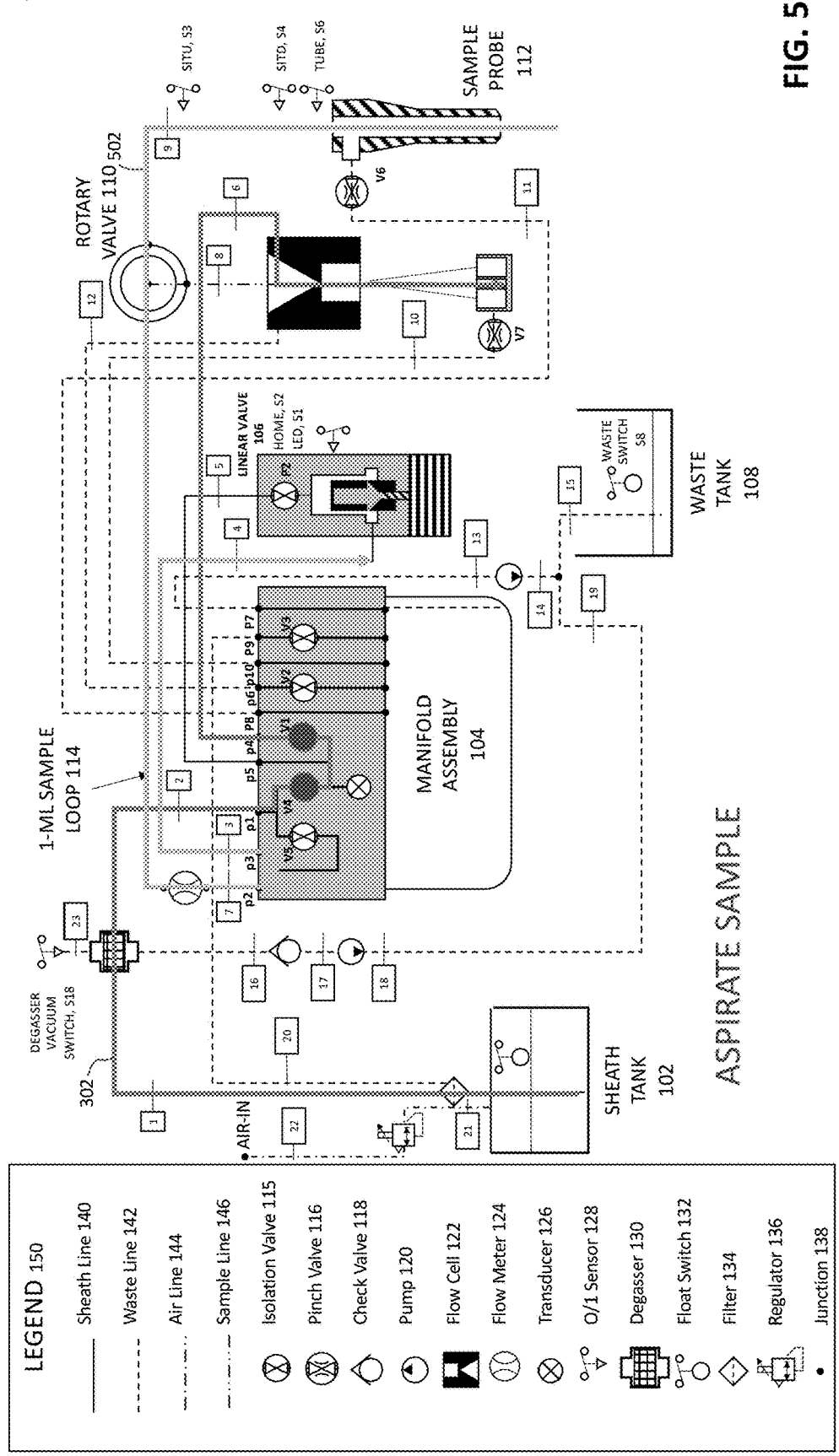
FIG. 5 is a schematic diagram of the central source pressure-based cytometer fluidics system during an operation for an aspirate sample.

FIG. 5 is a schematic diagram of the central source pressure-based cytometer fluidics system 100 during an operation for sample aspiration path 502. A purpose of the sample aspiration path 502 is to prepare the sample fluid for running in the system. On a first path, the sheath flows like fluid in the start stream path 302 that is discussed with reference to FIG. 3. For example, the sheath fluid flows into the manifold assembly 104 via port p1, flows through valve V4, flows through valve V1, flows through line 6, and enters the flow cell 122. The system 100 ejects a continuous sheath stream through a nozzle and an aspirator of the flow cell 122.

On a co-flowing second path (e.g., parallel aspirate sample path 502), the rotary valve couples the sample loop 114 to the sample probe 112. The linear valve 106 starts at a top position (e.g., piston in bore is at a top position). The linear valve 106 acts like a highly accurate syringe by increasing volume in the linear valve. For example, the piston in the bore moves downward and/or moves to increase vacuum suction in the linear valve. The linear valve 106 thereby pulls sample fluid into the sample loop 114 from the sample probe 112. In one embodiment, the sample loop 114 includes line 9, the rotary valve 110, the flow meter 124, line 7, the manifold assembly at ports p2 and port p3, and line 4.

However, the flow meter 124 is typically calibrated for sheath fluid (e.g., an aqueous solution). Sample fluid (e.g., blood sample) running through the flow meter 124 could cause the flow meter 124 to be off accuracy by as much as 5%. So, the sample fluid typically goes only partially through the sample loop 114 and does not reach the flow meter 124. The flow meter 124 typically only has sheath fluid (e.g., an aqueous solution) passing therethrough and is not contaminated with sample fluid. For example, the linear valve 106 may aspirate 0.5 ml of sample fluid, while the volume of the sample loop 114 is 1.0 ml. Such a volume of sample fluid would not reach the flow 124 if the system 100 is aspirated properly.

Advantageously, the linear valve 106 has a variable volume that can, for example, accurately aspirate 480 ml of sample fluid and leave 20 ml of air/gas right up near the rotary valve 110 in line 9. The system 100 wastes a minimal amount of sample fluid in the sample loop 114. The rotary valve 110 can then switch over to line 8 without introducing unwanted air/gas into the system 100. The rotary valve 110 enables substantial freedom on the placement of the sample probe 112 with respect to other components of the system 100. In one embodiment, sample probe 112 is near the flow cell 122. However, the sample probe 112 can be placed almost anywhere.

Boost Sample Fluid

Figure 6:
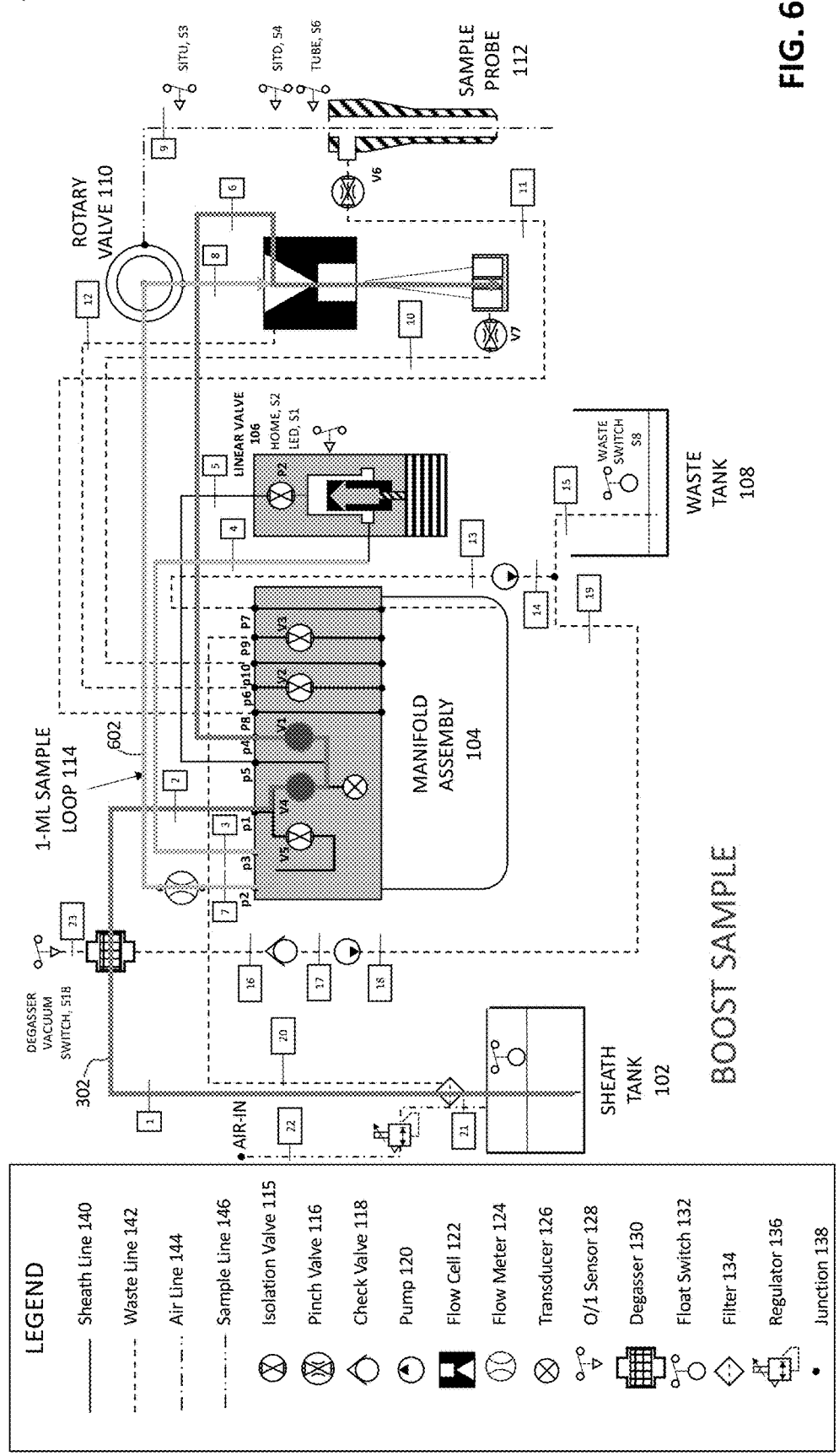
FIG. 6 is a schematic diagram of the central source pressure-based cytometer fluidics system during an operation for a boost sample.

FIG. 6 is a schematic diagram of the central source pressure-based cytometer fluidics system 100 during an operation for a boost sample path 602. On a first path, the sheath essentially flows like fluid in the start stream path 302 that is discussed with reference to FIG. 3. For example, the sheath fluid flows into the manifold assembly 104 via port p1, flows through valve V4, flows through valve V1, flows through line 6, and enters the flow cell 122. The system 100 ejects a continuous sheath stream through a nozzle and an aspirator of the flow cell 122.

On a co-flowing second path (e.g., parallel boost sample path 602), the rotary valve 110 is switched over to line 8 without introducing unwanted air/gas into the system 100.

The linear valve 106 can then perform a boost sample operation. The linear valve 106 moves to decrease volume in the linear valve 106. For example, the piston in the bore moves upward and/or moves to decrease vacuum suction in the linear valve. The linear valve 106 can drive an accurate amount of sample fluid such that the sample fluid abuts (or is substantially near) components of the flow cell 124. In that way, when the system later begins to run the sample fluid, the sample fluid is available at the flow cell 124 immediately or within a minimal amount of time. In one embodiment, the volume in line 8 between the rotary valve 110 and the flow cell 124 is about 25 ml. The system is then ready to run the sample fluid.

Run Sample Fluid

Figure 7:
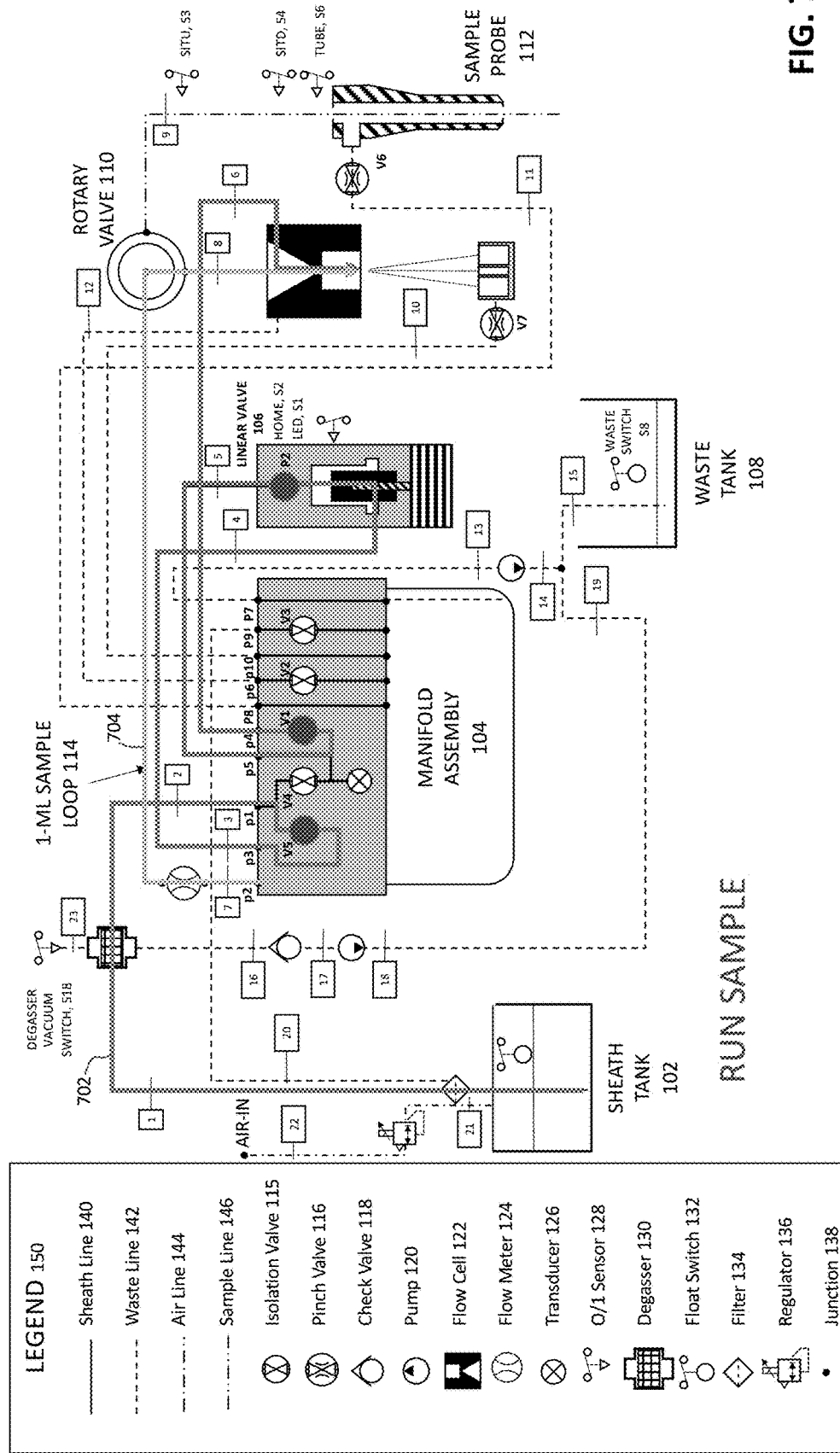
FIG. 7 is a schematic diagram of the central source pressure-based cytometer fluidics system during an operation for a run sample.

FIG. 7 is a schematic diagram of the central source pressure-based cytometer fluidics system 100 during an operation for a run sample path 704. The sample fluid is already in the sample loop 114. By turning valve V4 off and then turning valves V5 and P2 on, the system 100 enters a co-flowing path scenario (e.g., parallel path scenario). The sheath pressurizes line 2 at port p1. That pressure then causes fluid to flow through valve V5 and exit ports p2 and p3, simultaneously.

On a first path (e.g., run sample path 704), sample fluid exits the manifold assembly 104 at port p2, flows through line 7, flows through the rotary valve 110, flows through line 8, and enters the flow cell 122. Advantageously, this first path is relatively simple and facilitates cleaning of sample fluid in the system 100. Sample fluid can be difficult to clean because sample fluid tends to get stuck in any crevices or tight spots in the sample fluid path.

On a co-flowing second path (e.g., parallel sheath path 702), sheath fluid exits port p3, flows through line 3, flows through line 8, enters the linear valve 106 at a piston. The sheath fluid exits the linear valve 106 at valve P2, flows through line 5, enters the manifold assembly 104 at port p5, flows through valve V1, exits the manifold assembly at port p4, flows through line 6, and enters the flow cell 122.

The linear valve 106 acts like a variable restrictor (or a variable resistor in an electronics analogy) on the sheath fluid. The linear valve 106 includes a piston and a bore. The linear valve modulates the amount of restriction on the sheath fluid by varying the length of the gap between the piston and the bore. When the piston is lowered in the bore, the sheath fluid must go through a shorter gap path in the linear valve 106 and thereby undergoes less restriction. When the piston is raised in the bore, the sheath fluid must go through a longer gap path in the linear valve 106 and thereby undergoes more restriction.

Accordingly, the linear valve 106 enables control of flow rates in the system 100. To get a higher sample flow rate in the system 100, the piston in the linear valve 106 is raised, which causes sheath to be more restricted. However, the system 100 maintains a balance between the sheath fluid flow rate and the sample fluid flow rate, such that the total flow rate in the system 100 remains substantially constant. So, the system 100 responds to the decrease in the flow rate of sheath fluid by automatically and instantaneously increasing the flow rate of the sample fluid through the system 100. More sample fluid thereby gets pushed through the flow cell 122.

The pressure transducer 126, which is coupled below valves V1 and V4, is in liquid communication with both co-flowing paths (e.g., parallel sheath fluid path and parallel sample fluid path). The transducer 126 is also discussed with reference to FIG. 3.

Recover Sample Fluid

Figure 8:
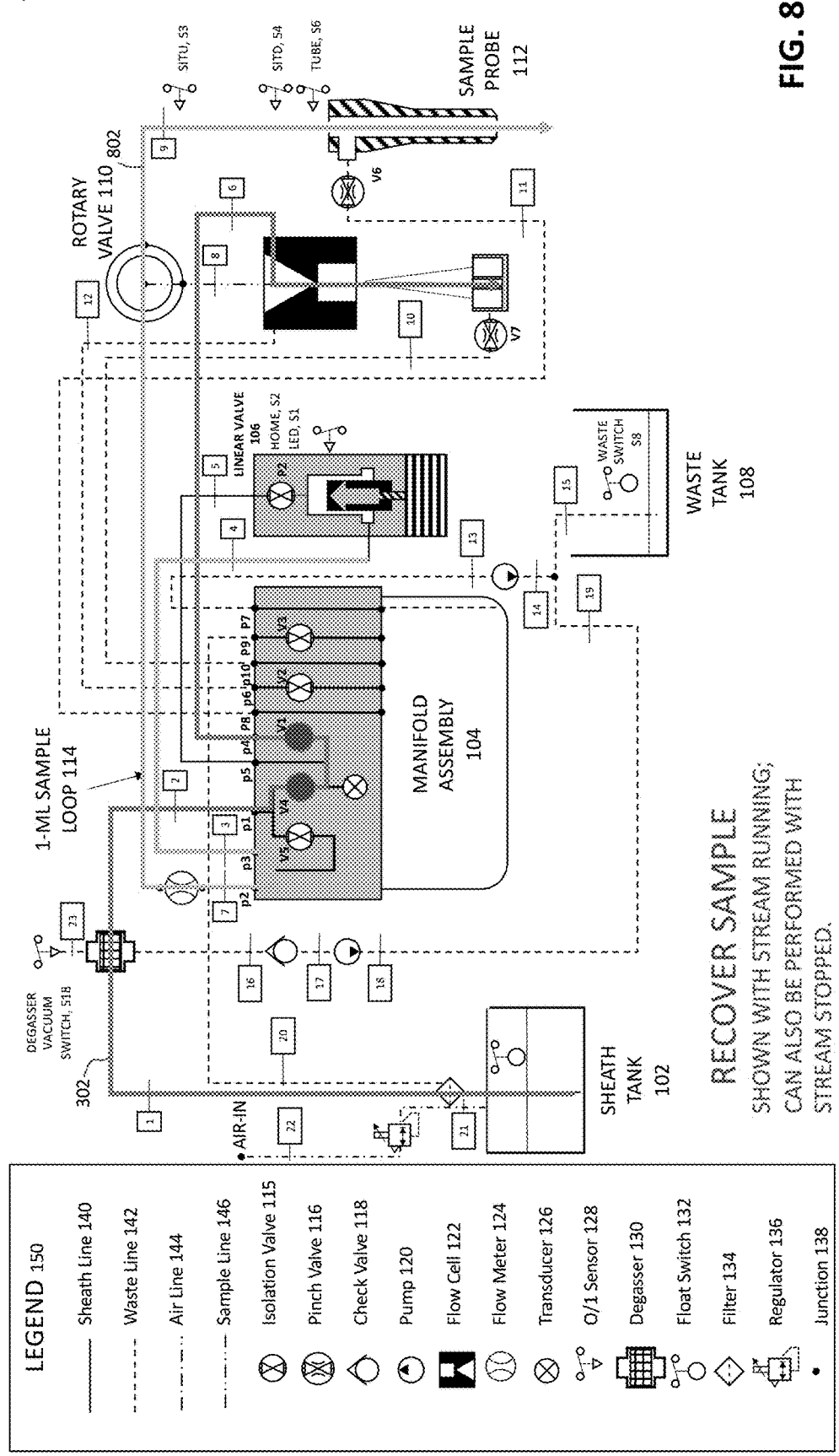
FIG. 8 is a schematic diagram of the central source pressure-based cytometer fluidics system during an operation for a recover sample.

FIG. 8 is a schematic diagram of the central source pressure-based cytometer fluidics system 100 during an operation for a recover sample path 802. A purpose of the recover sample path 802 is to recover unused sample fluid back into the sample probe 112.

On a first path, the sheath essentially flows like fluid in the start stream path 302, which is discussed with reference to FIG. 3. For example, the sheath fluid flows into the manifold assembly 104 via port p1, flows through valve V4, flows through valve V1, flows through line 6, and enters the flow cell 122. The system 100 ejects a continuous sheath stream through a nozzle and an aspirator of the flow cell 122.

In a co-flowing second path (e.g., parallel recover path 802), the sample moves in an opposite direction from the aspirated sample fluid path 502, which is discussed with reference to FIG. 5. In the recover sample path 802, the rotary valve 110 is switched to line 9 and couples the sample loop 114 to the sample probe 112. The linear valve 106 starts at a bottom position (e.g., piston in bore is at a bottom position). The linear valve 106 acts like a highly accurate syringe by moving up (e.g., the piston in the bore moves up) and pushes sample fluid out of the sample loop 114 and into the sample probe 112.

Advantageously, the system 100 can recover unused sample fluid in a metered and careful way. Sample fluid may cost, for example, $10,000 USD. The system 100 may have previously pulled in, for example, 500 ml of sample fluid during operations for the aspirate sample path 502 and may have used only 200 ml of sample fluid during the run sample path 704. The linear valve 106 can then move the piston up a distance to enable the system 100 to recover most of the 300 ml of unused sample fluid (e.g., the 500 ml of aspirated sample fluid minus the 200 ml of used sample fluid). The system may have to waste a minimal amount of the 300 ml of unused sample fluid (e.g., about 25 ml left over in line 8 between the rotary valve 110 and the flow cell 122).

In a traditional system (not shown), back filling the sample fluid is a problem. A traditional system separately pressurizes the sample fluid and the sheath fluid by using separate regulators at the same time. If the sample fluid's pressure regulator is malfunctioning, the seal on the sample vessel is not good enough to keep the sample fluid pressurized, and the system starts running the sample fluid, then sheath fluid is pushed right into the sample vessel. The system then backfills, dilutes, and can destroy the sample fluid.

Advantageously, the present system 100 substantially eliminates the backfilling problem by having one pressure regulator 136 for the system 100, instead of a pressure regulator for sheath fluid and another pressure regulator sample fluid. The system 100 does not separately pressurize the sample fluid. The system 100 aspirates sample fluid by using a syringe drive as discussed with reference to FIG. 5. The system 100 boosts sample fluid as discussed with reference to FIG. 6. The system 100 then runs sample fluid as discussed with reference to FIG. 7. Accordingly, the system 100 does not have to rely on a seal to pressurize the sample fluid and push the sample fluid through the system 100.

SIT Flush

Figure 9:
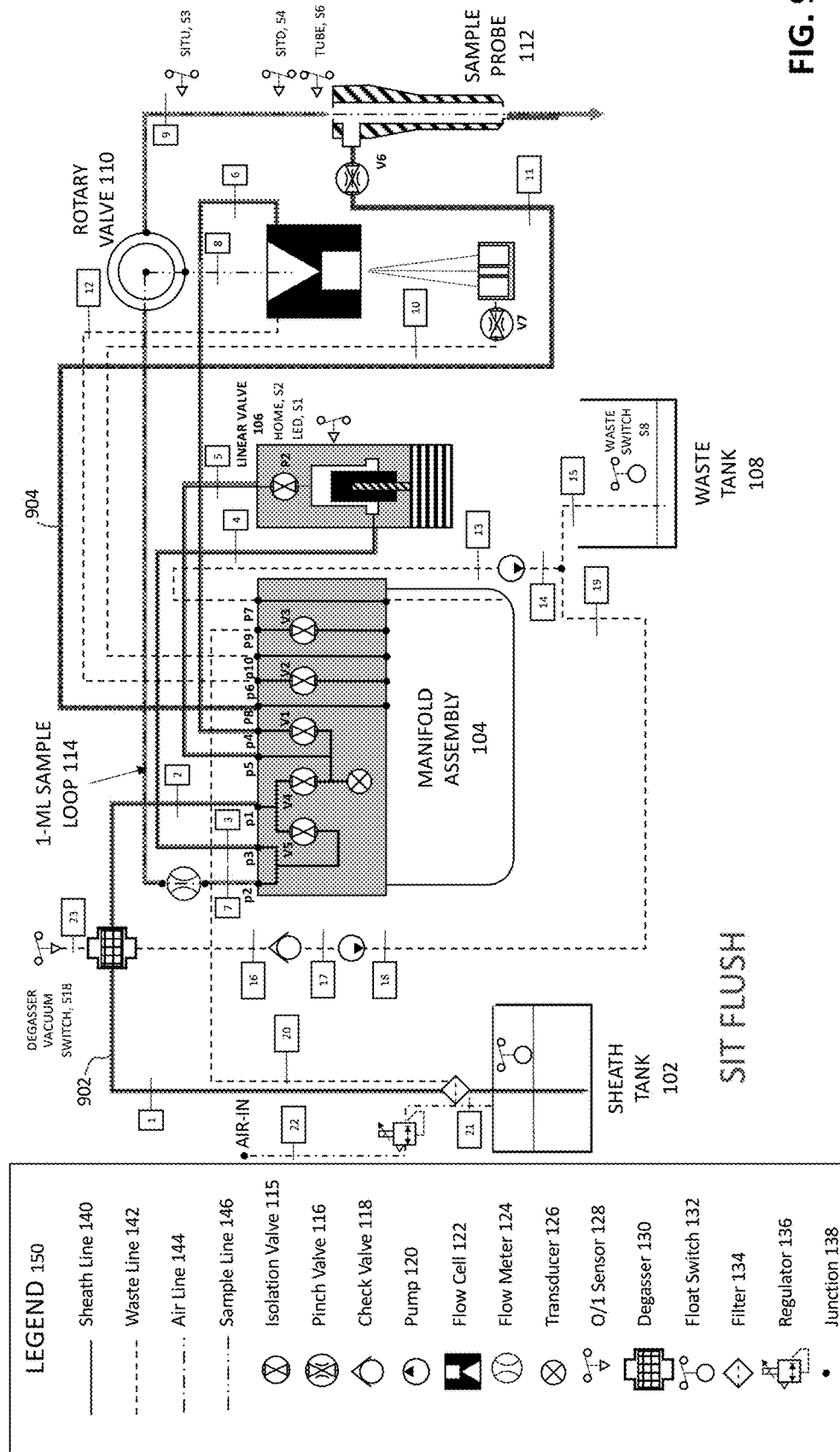
FIG. 9 is a schematic diagram of the central source pressure-based cytometer fluidics system during an operation for a SIT (sample injection tube) flush.

FIG. 9 is a schematic diagram of the central source pressure-based cytometer fluidics system 100 during an operation for a SIT (sample injection tube) flush path 904. A purpose of the SIT flush path 904 is clean the sample loop 114 to ensure carryover sample fluid is mitigated from sample-to-sample. In one embodiment, the sample loop 114 to be flushed includes, without limitation, lines 1-9. The aspiration line includes, without limitation, line 11.

The system 100 opens the rotary valve 110 so that the SIT flush path 904 experiences a full pressure of sheath fluid being pushed through the sample loop 114 and down through the sample probe 112. During this time, the system 100 opens valve V6 and aspirates the droplets coming out of the end of the sample probe 112 via valve V6 before the droplets drip out of the sample probe 112. Such aspiration washes the inside and outside of the sample line 114 simultaneously to eliminate a previous sample fluid, in preparation for a future sample fluid.

Normal Stream Aspiration

Figure 10:
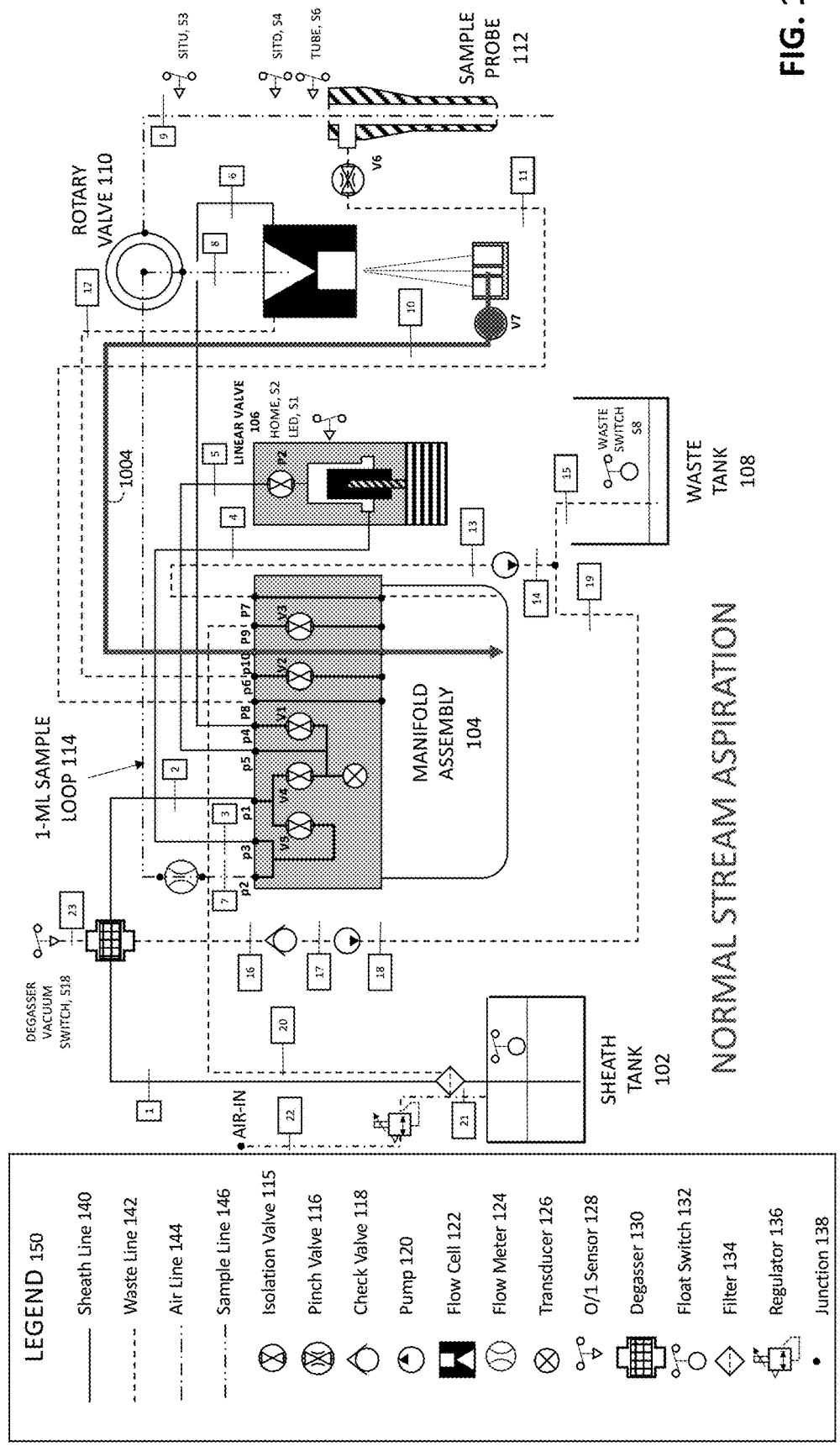
FIG. 10 is a schematic diagram of the central source pressure-based cytometer fluidics system during an operation for a normal stream aspiration.

FIG. 10 is a schematic diagram of the central source pressure-based cytometer fluidics system 100 during an operation for a normal stream aspiration path 1004. In one embodiment, the operation for the normal stream aspiration path 1004 is a background operation that the system 100 may be performing routinely. In one embodiment, the normal stream aspiration path 1004 includes, without limitation, line 10 and port p10 of the manifold assembly 104.

Valve v7 is typically open while the system 100 is active. If there is any fluid coming out of the nozzle from the flow cell 122, then the system 100 aspirates that fluid away via the normal stream aspiration path 1004.

Purge Filter

Figure 11:
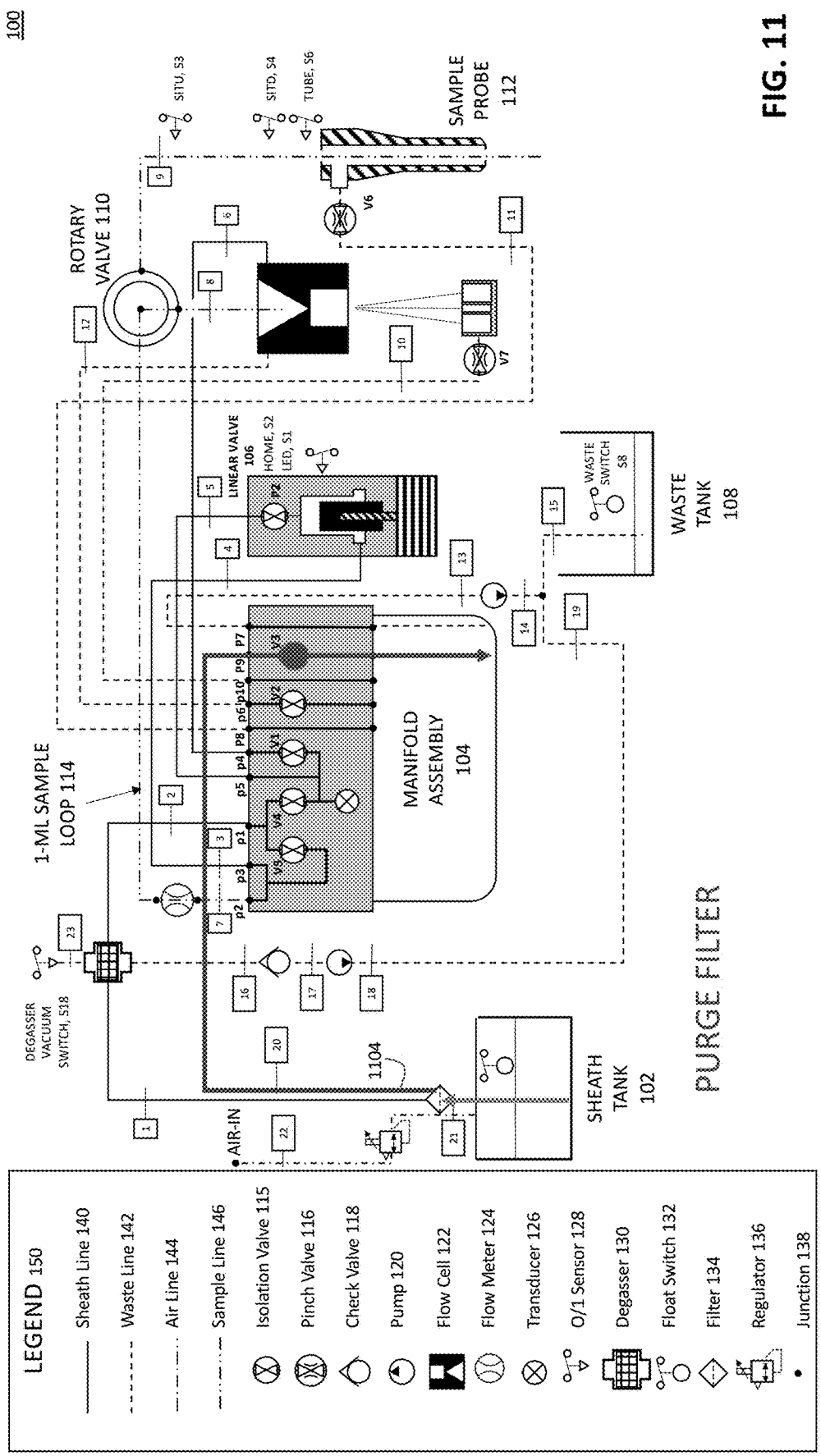
FIG. 11 is a schematic diagram of the central source pressure-based cytometer fluidics system during an operation for a purge filter.

FIG. 11 is a schematic diagram of the central source pressure-based cytometer fluidics system 100 during an operation for a purge filter path 1104. A purpose of the purge filter path 1104 is to remove air/gas from the sheath filter 134. In one embodiment, the purge filter path 1104 includes, without limitation, line 20, line 21, port p9, and valve V3. The purge filter path 1104 is important because the sheath fluid must remain wetted. Otherwise, sheath fluid that is not fully wetted affects the resistance of the system in unpredictable ways.

Waste Aspiration

Figure 12:
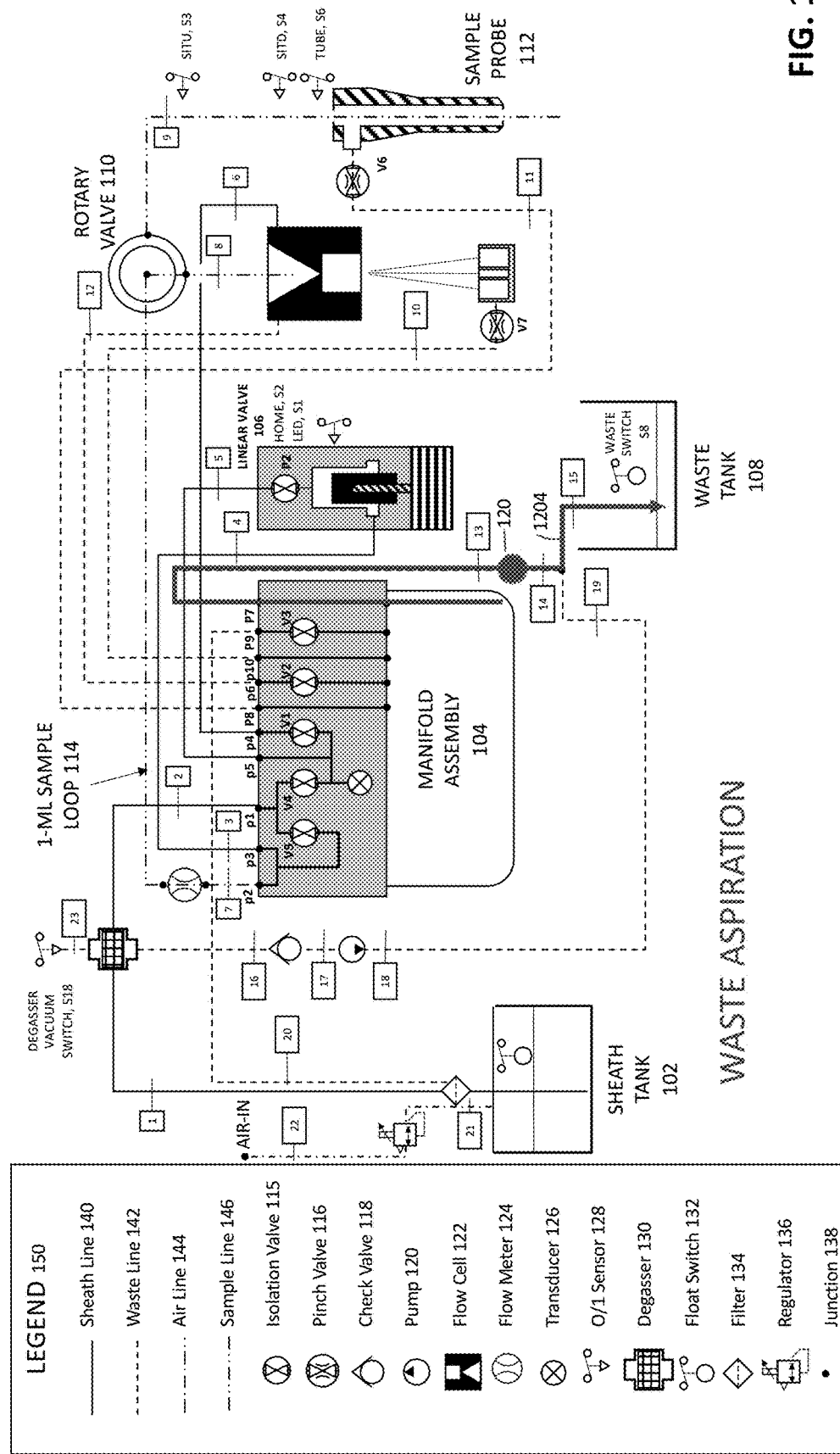
FIG. 12 is a schematic diagram of the central source pressure-based cytometer fluidics system during an operation for a waste aspiration.

FIG. 12 is a schematic diagram of the central source pressure-based cytometer fluidics system 100 during an operation for a waste aspiration path 1202. In one embodiment, the waste aspiration path 1202 includes, without limitation, port p7 and lines 13-15.

The pump 120 is couple to a tube/straw that reaches to the bottom of the manifold assembly 104. The pump 120 aspirates away any fluid that is being deposited into the bottom of manifold assembly 104. The pump 120 pumps that fluid into the waste tank 108. Such fluid may include waste such as cleaning bleach, contaminated sheath fluid, etc.

Method

FIG. 14 is a flowchart of a method 1400 for operating the central source pressure-based cytometer fluidics system 100. Other details, discussed with reference to other figures, may also be part of the method 1400.

In step 1405, the system 100 starts the sheath fluid flowing in the start stream path 302. The system pressurizes sheath fluid via a pressure regulation system, including the single pressure regulator 136 and the transducer 126. The pressure regulator 136 is not located inside the sheath tank 102. The pressure regulator 136 receives electrical feedback from the transducer 126 to provide pressure regulation for the system 100.

In step 1410, the system purges the flow cell 122. The system 100 cycles multiple times between operations for the purge path 302 and operations for the start stream path 302. Like the startup operations, the purging involves the system 100 using the single pressure regulator 136.

In step 1415, the system 100 aspirates the sample fluid. The system 100 rotates the rotary valve 110 toward the sample probe 112, moves the linear valve 106 downward, and sucks sample fluid from the sample probe 112.

In step 1420, the system 100 boosts the sample fluid. The system 100 by rotates the rotary valve 110 toward the flow cell 122, moves the linear valve 106 upward, and forces the sample fluid to abut the flow cell 122.

In step 1425, the system 100 runs the sample fluid. The system 100 pressurizes the sheath fluid via the single pressure regulator 136.

In step 1430, the system 100 recovers unused sample fluid. The system 100 rotates the rotary valve 110 back toward the sample probe 112 and moves the linear valve 106 upward.

In step 1435, the system 100 flushes the SIT. The system 100 by opens the rotary valve 110 so the system 100 experiences sheath fluid at full pressure.

In step 1440, the system 100 aspirates a normal fluid stream. The system 100 can perform such aspiration as a routine background operation for cleaning and maintenance.

In step 1445, the system purges the sheath filter path 1104. The purging removes air/gas from the sheath filter path 1104.

In step 1450, the system 100 aspirates waste fluid into the bottom of the manifold assembly 104.

When implemented in software, the elements of the embodiments of the invention are essentially the program, code segments, or instructions to perform the necessary tasks. The program, code segments, or instructions can be stored in a processor readable medium or storage device that can be read and executed by a processor. The processor readable medium may include any medium that can store information. Examples of the processor readable medium include, without limitation, an electronic circuit, a semiconductor memory device, a read only memory (ROM), a flash memory, an erasable programmable read only memory (EPROM), a floppy diskette, a CD-ROM, an optical disk, and a magnetic disk. The program or code segments may be downloaded via computer networks such as the Internet, Intranet, etc. and stored in the processor readable medium or storage device.

Some portions of the preceding detailed description may have been presented in terms of algorithms and symbolic representations that perform operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities may take the form of electrical (e.g., current or voltage) or magnetic signals capable of being stored, transferred, combined, compared, and otherwise manipulated. It has proven convenient at times, principally for reasons of common usage, to refer to these signals as bits, values, levels, elements, symbols, characters, terms, numbers, or the like.

However, all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, processing logic, or similar electronic computing device, that automatically or semi-automatically manipulates and transforms data represented as physical (electronic) quantities within the computer system's registers and memories into other data similarly represented as physical quantities within the computer system memories or registers or other such information storage, transmission or display devices.

Additionally, the embodiments of the invention are not described with reference to any particular programming language. It will be appreciated that a variety of programming languages may be used to implement the teachings of the embodiments of the invention as described herein.

This disclosure contemplates other embodiments or purposes. It will be appreciated that the embodiments of the invention can be practiced by other means than that of the described embodiments, which are presented in this description for purposes of illustration and not of limitation. The specification and drawings are not intended to limit the exclusionary scope of this patent document. It is noted that various equivalents for the particular embodiments discussed in this description may be practiced by the claimed invention as well. That is, while specific embodiments of the invention have been described, it is evident that many alternatives, modifications, permutations and variations will become apparent in light of the foregoing description. Accordingly, it is intended that the claimed invention embrace all such alternatives, modifications and variations as fall within the scope of the appended claims. The fact that a product, process, or method exhibits differences from one or more of the described exemplary embodiments does not mean that the product or process is outside the scope (literal scope and/or other legally-recognized scope) of the following claims.

What is claimed is:

1. A cytometer fluidics system, comprising:
a sheath tank;
a manifold assembly coupled to the sheath tank via a first sheath line;
a flow cell coupled to the manifold assembly via a second sheath line;
a first valve coupled to the first sheath line and in the manifold assembly;
a start stream path including the first sheath line and the second sheath line, wherein the start stream path extends from the sheath tank to the flow cell;
a pressure regulation system coupled to the sheath tank, the pressure regulation system including a pressure regulator and a transducer coupled to the first valve and electrically coupled to the pressure regulator, wherein the pressure regulator is an only regulated pressure source in the cytometer fluidics system that applies a regulated pressure to the sheath tank to maintain a total flow rate of fluids in the cytometer fluidics system, wherein the transducer is configured to sense measured pressure at the first valve and convert the measured pressure to a voltage and the pressure regulator is configured to receive the voltage from the transducer and convert the voltage into the regulated pressure;
wherein the pressure regulation system maintains the regulated pressure by attempting to match the regulated pressure with the measured pressure;
wherein the total flow rate is equal to a flow rate of sheath fluid in the start stream.

2. The cytometer fluidics system of claim 1, further comprising:

a flow cell purge path including a third sheath line that extends from the flow cell to the manifold assembly, wherein the cytometer fluidics system is configured to perform a cycling between operations for the start stream path and operations for the flow cell purge path, and wherein the cycling forces gas bubbles from the flow cell into the manifold assembly.

3. The cytometer fluidics system of claim 1, further comprising:
an aspirate sample path coupled to the manifold assembly;
a linear valve coupled to the manifold assembly via aspirate sample path; and
a sample probe coupled to the manifold assembly via the aspirate sample path, wherein the linear valve is configured to aspirate sample into the aspirate sample path by increasing volume in the linear valve.

4. The cytometer fluidics system of claim 1, further comprising:
a boost sample path coupled to the manifold assembly;
a linear valve coupled to the manifold assembly via the boost sample path; and
a rotary valve positioned to couple the manifold assembly to the flow cell via the boost sample path, wherein the linear valve is configured to drive a predetermined amount of sample fluid through the boost sample path such that the sample fluid abuts the flow cell.

5. The cytometer fluidics system of claim 1, further comprising:
a run sample path coupled to the manifold assembly;
the manifold assembly being coupled to the flow cell via the run sample path;
a parallel sheath path coupled to the manifold assembly; and
a linear valve coupled to the manifold assembly via the parallel sheath path.

6. The cytometer fluidics system of claim 1, further comprising:
a recover sample path coupled to the manifold assembly;
a linear valve coupled to the manifold assembly via the recover sample path; and
a sample probe coupled to the manifold assembly via the recover sample path, wherein the linear valve is configured to push sample fluid from the recover sample path by decreasing volume in the linear valve.

7. The cytometer fluidics system of claim 1, further comprising:
a sample injection tube (SIT) flush path coupled to the manifold assembly; and
a sample probe coupled to the manifold assembly via the SIT flush path, wherein the SIT flush path is configured to experience a full pressure of sheath fluid being pushed down to the sample probe.

8. The cytometer fluidics system of claim 1, further comprising:
a normal stream aspiration path coupled to the manifold assembly; and
a second valve configured to receive fluid exiting a nozzle of the flow cell, wherein the second valve is coupled to the manifold assembly via the normal stream aspiration path, and wherein the cytometer fluidics system aspirates the fluid exiting nozzle away to the manifold assembly.

9. The cytometer fluidics system of claim 1, further comprising:
a purge filter path coupled to the manifold assembly; and
a sheath filter coupled to the manifold assembly via the purge filter path, wherein the purge filter path is configured to purge gas from the sheath filter and maintain the sheath filter in a wetted state.

10. The cytometer fluidics system of claim 1, further comprising:
a waste aspiration path coupled to the manifold assembly;
a waste tank coupled to the manifold assembly via the waste aspiration path; and
a pump coupled to the waste aspiration path and configured to aspirate fluid deposited into a bottom of the manifold assembly.

11. A method for operating a cytometer fluidics system recited in claim 1, the method comprising:
pressurizing sheath fluid in the start stream path, wherein the sheath fluid is pressurized via the pressure regulation system including the pressure regulator and the transducer;
sensing a measured pressure in the start stream path, wherein the sensing is carried out by the transducer independently of the sheath tank;
converting the measured pressure into a voltage;
communicating the voltage to the pressure regulator; and
translating the voltage to a regulated pressure that substantially matches the measured pressure.

12. The method of claim 11, further comprising:
purging the flow cell by cycling multiple times between operations of a purge path and operations of the start stream path.

13. The method of claim 11, further comprising:
aspirating sample fluid by increasing a volume in a linear valve and sucking sample fluid from a sample probe.

14. The method of claim 11, further comprising:
boosting sample fluid by decreasing a volume in a linear valve and forcing the sample fluid to abut the flow cell.

15. The method of claim 11, further comprising:
running the sample fluid by pressurizing the sheath fluid via the pressure regulator.

* * * * *